United States Patent
Cieszkowski, III et al.

(10) Patent No.: US 9,755,848 B2
(45) Date of Patent: Sep. 5, 2017

(54) SYSTEM AND METHOD FOR SIMULATING A USER PRESENCE

(71) Applicants: Richard Matthew Cieszkowski, III, Bloomfield Hills, MI (US); Timothy David Smith, Bloomfield Hills, MI (US)

(72) Inventors: Richard Matthew Cieszkowski, III, Bloomfield Hills, MI (US); Timothy David Smith, Bloomfield Hills, MI (US)

(*) Notice: Subject to any disclaimer, the term of this patent is extended or adjusted under 35 U.S.C. 154(b) by 146 days.

(21) Appl. No.: 14/715,899

(22) Filed: May 19, 2015

(65) Prior Publication Data

US 2015/0331483 A1 Nov. 19, 2015

Related U.S. Application Data

(60) Provisional application No. 62/000,279, filed on May 19, 2014.

(51) Int. Cl.
*H04L 12/18* (2006.01)
*G06F 3/01* (2006.01)
(Continued)

(52) U.S. Cl.
CPC ........ *H04L 12/1827* (2013.01); *A63F 13/211* (2014.09); *A63F 13/212* (2014.09); *A63F 13/213* (2014.09); *A63F 13/428* (2014.09); *A63F 13/5255* (2014.09); *A63F 13/87* (2014.09); *G06F 3/011* (2013.01);
(Continued)

(58) Field of Classification Search
CPC ...... A63F 13/428; A63F 13/21; A63F 13/211; A63F 13/213; A63F 13/5255; A63F 13/87; A63F 13/212; G06F 3/01; G06F 3/011; G06F 3/017; G06F 3/016;
(Continued)

(56) References Cited

U.S. PATENT DOCUMENTS

| 5,980,256 A * | 11/1999 | Carmein | A63B 22/02 434/29 |
| 7,046,151 B2 | 5/2006 | Dundon | |
| 2005/0143172 A1* | 6/2005 | Kurzweil | A63F 13/12 463/30 |

OTHER PUBLICATIONS

Ed Owswald, "Breakthrough! Japanese Inventors Introduce a Remote Kissing Device", Technologizer, a Smarter Take on Tech, May 5, 2011, http://www.technologizer.com/2011/05/05/kissing-machine/.

(Continued)

*Primary Examiner* — Towfiq Elahi
(74) *Attorney, Agent, or Firm* — John S. Artz; Dickinson Wright, PLLC

(57) ABSTRACT

A system and method for simulating a presence between a first user in a first pod at a first location and a second user in a second pod at a second location is provided. A first user suit is disposed in the first grid pod and a second user suit is disposed in the second grid pod. A first controller unit is electrically connected with the first pod and a second controller unit is electrically connected with the second pod. At least one input sensor is disposed in each of the first and second pods. Output devices are disposed in the first and second pods. A mainframe is electrically connected with the first and second controller units for receiving inputs from the input sensors and for providing instructions for activating the output devices to simulate the interaction of the first and second users with one another.

20 Claims, 2 Drawing Sheets

(51) Int. Cl.
    *G06T 19/00*          (2011.01)
    *H04L 12/58*          (2006.01)
    *A63F 13/428*        (2014.01)
    *A63F 13/211*        (2014.01)
    *A63F 13/213*        (2014.01)
    *A63F 13/5255*       (2014.01)
    *A63F 13/87*          (2014.01)
    *A63F 13/212*        (2014.01)
    *A63F 13/90*          (2014.01)

(52) U.S. Cl.
    CPC .............. *G06F 3/016* (2013.01); *G06F 3/017* (2013.01); *G06T 19/006* (2013.01); *H04L 12/1813* (2013.01); *H04L 51/043* (2013.01); *A63F 13/90* (2014.09); *G06F 2203/013* (2013.01)

(58) Field of Classification Search
    CPC . G06F 2203/013; H04L 12/18; H04L 51/043; H04L 12/1813; H04L 12/1827; G06T 19/006
    See application file for complete search history.

(56) References Cited

OTHER PUBLICATIONS

Matthew O'Mara and Matt Hartley, "Canadians Launch Kickstarter Campaign to Create Sensory Feedback Video Game Suit", Post Arcade, Financial Post, Jun. 3, 2013, http://business.financialpost.com/fp-tech-desk/post-arcade/canadiens-launch-kickstarter-campaign-to-create-sensory-feedback-video-game-suit?__lsa=66e8-8013.

\* cited by examiner

SYSTEM AND METHOD FOR SIMULATING A USER PRESENCE

CROSS REFERENCE TO RELATED APPLICATIONS

This application claims the benefit of U.S. Provisional Patent Application Ser. No. 62/000,279 filed on May 19, 2014, the entire disclosure of which is hereby incorporated by reference.

TECHNICAL FIELD

The present disclosure broadly relates to a system and method for inputting and receiving bio feedback through a virtual reality space. More specifically, the present disclosure relates to a system and method that allows for real time presence simulation between a first user at one location and a second user at another location through a virtual reality space.

BACKGROUND OF THE INVENTION

The Internet has produced explosive growth in numerous markets including gaming, on-line chat, video conferencing, adult entertainment, medical treatments and information dissemination. The number of users has also exploded with the introduction of new and more realistic technologies. As wireless service providers are providing broadband access to cell phones, fixed line and cable service providers have been forced to offer broadband services or be left behind. The deployment of broadband services to homes and individuals has brought about the desire and ability to utilize the greatly increased bandwidth provided by broadband.

As applications on wireless communication networks move closer to the Internet, products are being developed that utilize both software and firmware (e.g. microcode) to take advantage of those capabilities. Computer system developers are working to more realistically simulate the virtual world found in computer applications so as to mimic the real world in a virtual reality. To transform this simulation and movement to a virtual reality, software, firmware and hardware devices work in tandem to simulate a person's senses and create a sensory illusion to match the interactions within the virtual world as created by a computer program.

Vision and sound have been readily incorporated by computer systems into the virtual reality. Further, development paths have included "virtual helmets" that provide a wearer with realistic visual simulations and incorporate headphones to provide both a sight and sound illustration of reality for the computer interface. More simplistic computer screens and speakers, however, do not deliver as effective an illusion of reality. While vision and hearing have been incorporated, the other three human senses—touch, smell, taste—have not been as easily simulated to create a virtual reality for the computer user.

Other developments have utilized existing platforms and technologies within 3-Dimensional ("3D") virtual reality and linked those applications through the Internet with broadband services provided via wire-line or wireless communications networks to provide a physical sensation of touch matching a user's interactions and actions within an Internet or computer driven virtual work or in response to a computer program or device protocol. This allows the user to interact within a virtual, computer generated world by imparting feelings or sensations of impact and touch to whatever actions the user takes within the virtual world.

These developments to date, however, have only involved inputting touch or other senses into a virtual reality or having a computer outputting computer generated sensory feedback to a user.

SUMMARY OF THE INVENTION

It is therefore an aspect of the present disclosure to provide a system and method that provides more realistic simulated user presence through a virtual reality space that is based on realistic movement and not computer generated feedback. It is another aspect of the present disclosure to provide a system and method that allows users in different places to interact remotely with one another in real time based on their movements in real time.

It is another aspect of the present disclosure to provide a system and method that allows users in different places to interact remotely with one another in real time based in their movements in real time.

It is a further aspect of the present disclosure to provide a system and method that allows users in different places to interact remotely with one another in real time through a virtual network.

According to a further aspect of the disclosure, a system for simulating a presence between a first user at a first location and a second user at a second location is provided. The system includes a first pod at the first location for being entered by the first user. A first user suit is disposed in the first grid pod for being worn by the first user. A first controller unit is electrically connected with the first pod for receiving inputs and emitting outputs to the first pod. At least one input sensor is disposed in the first pod and is electrically connected to the first controller unit for providing the first controller unit with input data detected by the input sensors of the first pod. The at least one input sensor in the first pod includes at least one motion sensor for detecting movement of the first user suit within the first pod. At least one output device is disposed in the first pod and is electrically connected with the first controller unit for selectively being activated. The at least one output device in the first pod includes at least one output device disposed on the first user suit for providing physical feedback to the first user. A second pod is at the second location for being entered by the second user. A second user suit is disposed in the second pod for being worn by the second user. A second controller unit is electrically connected with the second pod for receiving inputs and emitting outputs to the second pod. At least one input sensor is disposed in the second pod and is electrically connected to the second controller unit for providing the second controller unit with input data detected by the input sensors of the second pod. The at least one input sensor in the second pod includes at least one motion sensor for detecting movement of the second user suit within the second pod. At least one output device is disposed in the second pod and is electrically connected with the second controller unit for selectively being activated. The at least one output device in the second pod includes at least one output device that is disposed on the second user suit to provide physical feedback to the second user. A mainframe is electrically connected with the first and second controller units and receives inputs from the first and second controller units and provides instructions to the first and second controller units to activate the output devices on the first and second user suits at locations that correspond with the movement detected by the motion sensors of the first and second pods to simulate the interaction of the first and second users with one another.

According to yet another aspect of the disclosure, a method for simulating a presence between a first user in a first pod at a first location and a second user in a second pod at a second location is provided. The method includes detecting a position of at least part of a first user suit in the first pod using an input sensor, and detecting a position of at least part of a second user suit in the second pod using an input sensor. The detected position of the first user is electronically transmitted to a mainframe, and the detected position of the second user is electronically transmitted to a mainframe. The detected position of the first user suit is transmitted from the mainframe to a second controller that is electronically connected with the second pod and the second user suit, and the detected position of the second user suit is transmitted from the mainframe to a first controller that is electrically connected with the first pod and the first user suit. An output device that is disposed in the second pod is activated at a location that correlates with the detected position of the first user suit by the second controller, and an output device that is disposed in the first pod is activated at a location that correlates with the detected position of the second user suit by the first controller.

According to the above and the other aspects of the present disclosure, a system and method for allowing real time interaction between users at remote locations is provided as shown and described.

BRIEF DESCRIPTION OF THE DRAWINGS

Other aspects of the present disclosure will be readily appreciated, as the same becomes better understood by reference to the following detailed description when considered in connection with the accompanying drawings wherein.

DESCRIPTION OF THE ENABLING EMBODIMENT

Figure 1:
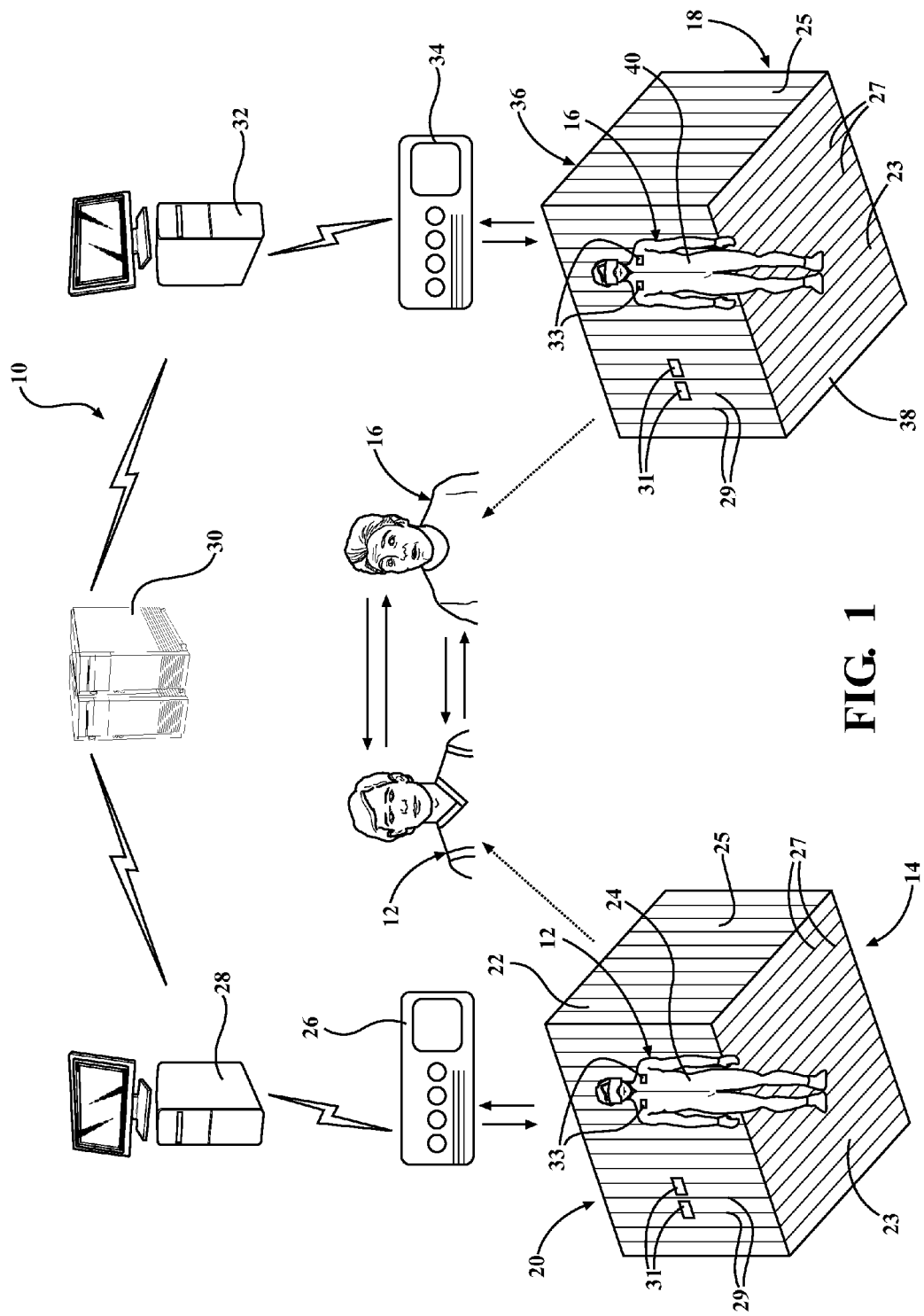
FIG. 1 is a schematic illustration of a bio feedback virtual reality system in accordance with an aspect of the disclosure.

The present disclosure relates to a system and method for allowing real time user exchanged bio feedback through a virtual reality network that is based on the movements and sensory perception of each user. According to an aspect, the system and method can be employed by multiple users located in different locations, such that they are at separate and remote locations. According to another aspect, the system and method can be employed by users in different parts of the same location. Additionally, the system and method can accommodate any number of users at any combination of locations.

According to an aspect, the system 10 can generally include a first user 12 disposed at a first location 14 and a second user 16 disposed at a second location 18.

The first user 12 may be in communication with a first environment 20. According to another aspect, the first environment 20 can include a first pod 22 and a first user suit 24 that cooperate to create a virtual reality experience. In the exemplary embodiment, the first pod 22 is a first grid centric pod 22 that includes a floor 23 and four walls 25. The walls 25 extend perpendicularly to the floor 23. A first grid is defined in the pod 22 that has a plurality of horizontal axes 27 that extend parallel to the floor 23 and a plurality of vertical axes 29 that extend parallel to the walls 25.

According to a further aspect, each of the first grid centric pod 22 and the first user suit 24 may be in communication with a first controller unit 26 that is configured to receive inputs from and emit outputs to the first virtual environment 20. Furthermore, the first controller unit 26 may define the first grid electronically. Said another way, the first controller unit 26 may establish an electronic version of the first pod 22 that has the same dimensions as the physical first pod 22 such that actions that occur in the physical first pod 22 may be tracked and displayed within the electronic first grid pod.

According to an aspect, the first environment 20 cooperates to register inputs in the form of user movements, actions, and sensory perceptions as captured by input sensors 31 disposed the first environment 20 and provide input data captured from the input sensors 31 the first controller unit 26. Put another way, the first environment 20 captures and mirrors physical human inputs to allow them to be simulated at another location. These user inputs can be physical movements alone or can be coupled with inputs in the form of other sensory inputs. According to an aspect, the first user suit 24 together with the first grid centric pod 22 can create the simulation of a human's presence. In the exemplary embodiment, the input sensors 31 include a plurality of motion sensors that provide the first controller unit 26 with three-dimensional coordinates of the location of the first user suit 24 within the first centric pod 22. According to another aspect, different or additional input sensors 31 may be utilized to capture the first user's 12 movements and senses. According to a further aspect, an exemplary sensory input device can include an oculus Rift™ device, such as has been promoted by Google™, Inc., accelerometers, other motion sensors, light sensors, laser grid technology, and physical energy sleeves (NASA™).

According to an aspect, the pod 22, 38 may include, or the first user suit 24 may be rigged with, a variety of output devices 33 to assist with detecting and providing human movements and sensory feedback, including air ballasts, electric impulse emitters, vibrators, dummies, thermal manipulation and smell emitting devices. It will be appreciated that a variety of other output devices 33 and input devices may be employed. Any suitable virtual reality suit may be employed. Exemplary suitable virtual reality components can include an RTT pinch Glove™, other 4$^{th}$ generation haptic technologies, ultra sound waves, haptic teleportation, electric impulse emitters and the like.

According to a further aspect, the first grid centric pod 22 can work with the first user suit 24 and an output device 33 such as a robotic dummy to simulate user presence and user senses. According to this aspect, dummy parts of various sizes can be utilized to form the appropriate size of the human in the experience to provide a more accurate and realistic experience. Other possible pod technologies could be smell, sound, and various haptic systems. According to an aspect, the first pod 22 may also include a stepping system, such as on the floor 23 thereof that will allow for user movement and tracking therefore in the virtual space. According to a further aspect, a user house could serve as a pod 22, 38. As used herein, a pod 22, 38 may be any structure that uses output devices to project the experience to the user.

According to an aspect, the first controller unit 26 may be in communication with a first application server 28. According to an aspect, the first application server 28 may be configured to establish a network communication with a main server, referred to herein as a hyper haptic server mainframe, as generally designated by reference number 30. The communication between the first controller unit 26 and the hyper haptic mainframe 30 can be accomplished via a broadband communication over the Internet. It will be appreciated that communication can also be accomplished by a wireless or Wi-Fi communication or cellular connection.

According to another aspect, the hyper haptic mainframe 30 can communicate with a second application server 32 associated with the second user 16 at the second location 18. The second application server 32 may be in communication with a second controller unit 34 that is in communication with a second environment 36. According to an aspect, the second environment 36 can consist of a second pod 38, e.g., second grid centric pod 38, and a second user suit 40 that cooperate to create a virtual reality. The second grid centric pod 38 and the second user suit 40 may have the same configuration as those discussed above in connection with the first environment 20. Each of the second grid centric pod 38 and the second user suit 40 can communicate with the second controller unit 34 to receive inputs from and emit outputs to the second virtual environment 36 in the same fashion as discussed above in connection with the first environment 20. According to an aspect, the second environment 36 can cooperate to register inputs in the form of user movements and actions and input those to the second controller unit 34. These user inputs can be physical movements alone or can be coupled with inputs in the form of other sensory inputs. The second user suit 40 together with the second grid centric pod 38 can create the simulation of a human's presence. The second environment 36 can be configured to operate the same as the first environment 20 with the same components. According to another aspect, the components and operation of each environment may be different.

It will also be appreciated that while the term human has been utilized in connection with the description of the aspects above, the system can also be utilized with other living beings such as pets or animals. An exemplary system can include a pet home monitoring system. Other interactive applications can also be simulated.

According to a still further aspect and as generally described in the preceding, the virtual space/room can be set up grid style, such that the user's pod 22, 38 and the grid overlap can give the suit a virtual outline presence. The virtual space/room can be hosted on the presence mainframe 30. In operation, as the user 12, 26 moves on the grid in his box, he can also move on the virtual box grid, which is how the proximity of the user to other avatars can be determined. The pod 22, 38 and suit 24, 40 may coordinate together to simulate the sense of touch using haptic and physical feedback technologies. According to a more specific aspect, the motion sensor(s) of the first pod 22 may provide the first controller unit with three-dimensional coordinates of the location of the first user suit 24 within the first grid, and the motion sensor of the second pod 38 may provide the second controller unit with three-dimensional coordinates of the location of the second user suit 40 within the second grid to activate the output devices 33 on the first and second user suits 24, 40 at locations that correspond with the detected three-dimensional coordinates. Thus, for example, the motion sensors in the first pod 22 could detect the location of the first user's 12 arm during movement thereof and thus an output device 33 in the second pod 38 is activated at the same coordinate locations in the second pod 38 to simulate the movement of the arm of the first user 12 to the second user 16. It should be appreciated that any number of motion sensors could be used to detect the position of any number of areas of the first and second user suits 24, 40. Additionally, it should be appreciated that the input sensors 31 and output devices may be configured to be synced with each other such that movements (or other inputs) can be captured and replicated substantially in real time. Furthermore, it should be appreciated that any number of other types of sensors, e.g., a scent detector, and output devices, e.g., a scent emitter, could be used in the same way as described above.

Thus according to an aspect, in operation the user 12, 16 can start by putting on the suit 24, 40 and entering the pod 22, 38. Once situated, the pod 22, 38 and suit 24, 40 can sync up in order to create an experience. The movements of the user 12, 16 may be translated into a digitally virtual room where they are able to see other users around them. As this "chat room" has more people enter it through the Internet, those people are able to interact with each other and feel the sensations of each other's physical presence, i.e., handshake, hug, etc. This technology is designed to simulate the concept of teleportation.

Figure 2:
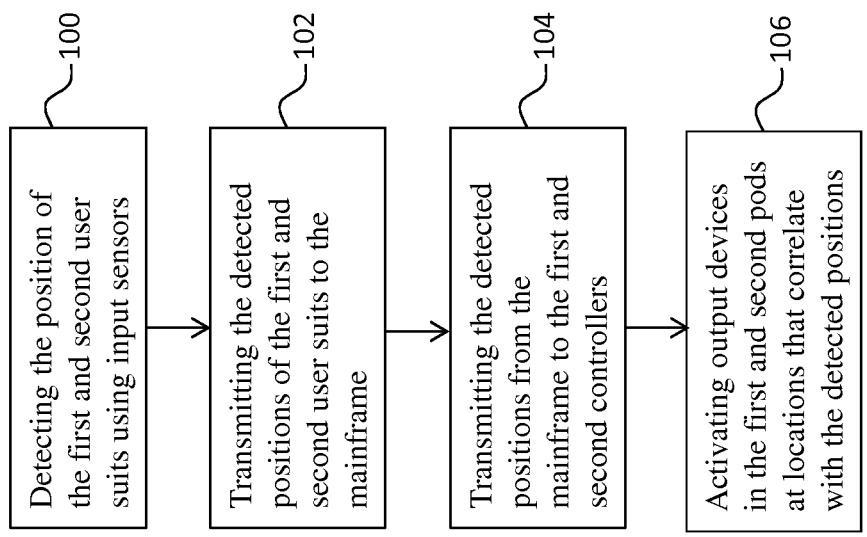
FIG. 2 is a flow diagram of a method of simulating a presence between a first user in a first pod at a first location and a second user in a second pod at a second location in accordance with an aspect of the disclosure.

According to a further aspect of the disclosure, a method for simulating a presence between a first user 12 in a first pod 22 at a first location and a second user 16 in a second pod 38 at a second location is provided. As best presented in FIG. 2, the method includes 100 detecting a position of at least part of a first user suit 24 in the first pod 22 using an input sensor 31, and detecting a position of at least part of a second user suit 40 in the second pod 38 using an input sensor 31. It should be appreciated that any number of input sensors 31 could be utilized and the input sensors 31 could be positioned at various locations in the first and second pods 22, 38 at various locations on the first and second user suits 24, 40. The method proceeds by 102 electronically transmitting the detected position of the first user suit 24 to a mainframe 30, and electronically transmitting the detected position of the second user suit 40 to the mainframe 30. The method continues with 104 electronically transmitting the detected position of the first user suit 24 from the mainframe 30 to a second controller 34 that is electronically connected with the second pod 38 and the second user suit 40, and electronically transmitting the detected position of the second user suit 40 from the mainframe 30 to a first controller 26 that is electronically connected with the first pod 22 and the first suit 24. Furthermore, the method includes 106 activating an output device 33 disposed in the second pod 38 at a location that correlates with the detected position of the first user suit 24 with the second controller 34, and activating an output device 31 disposed in the first pod 38 at a location that correlates with the detected position of the second user suit 40 with the first controller 26.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A system for simulating a presence between a first user at a first location and a second user at a second location, comprising:
    a first pod at the first location for being entered by the first user;
    a first user suit disposed in said first pod for being worn by the first user;
    a first controller unit electrically connected with said first pod for receiving inputs and emitting outputs to said first pod;
    at least one input sensor disposed in said first pod and electrically connected to said first controller unit for providing said first controller unit input data detected by said input sensors of said first pod;
    said at least one input sensor in said first pod including at least one motion sensor for detecting movement of said first user suit within said first pod;
    at least one output device disposed in said first pod electrically connected with said first controller unit for selectively being activated;
    said at least one output device in said first pod including at least one output device disposed on said first user suit for providing a physical stimulus to the first user;
    a second pod at the second location for being entered by the second user;
    a second user suit disposed in said second pod for being worn by the second user;
    a second controller unit electrically connected with said second pod for receiving inputs and emitting outputs to said second pod;
    at least one input sensor disposed in said second pod and electrically connected to said second controller unit for providing said second controller unit with input data detected by said input sensors of said second pod;
    said at least one input sensor in said second pod including at least one motion sensor for detecting movement of said second user suit within said second pod;
    at least one output device disposed in said second pod electrically connected with said second controller unit for selectively being activated;
    said at least one output device in said second pod including at least one output device disposed on said second user suit for providing a physical stimulus to the second user; and
    a mainframe electrically connected with said first and second controller units receiving inputs from said first and second controller units and providing instructions to said first and second controller units to activate said output devices on said first and second user suits at locations that correspond with said movement detected by said motion sensors of said first and second pods to simulate the interaction of the first and second users with one another;
    wherein said first pod includes a floor and at least one wall extending generally perpendicularly to said floor to define a first grid having a plurality of horizontal axes extending parallel to said floor and a plurality of vertical axes extending parallel to said wall, said second pod includes a floor and at least one wall extending generally perpendicularly to said floor to define a second grid having a plurality of horizontal axes extending parallel to said floor and a plurality of vertical axes extending parallel to said wall, said motion sensor of said first pod providing said first controller unit with three-dimensional coordinates of the location of said first user suit within said first grid, and said motion sensor of said second pod providing said second controller unit with three-dimensional coordinates of the location of said second user suit within said second grid to activate said output devices on said first and second user suits at locations that correspond with the three-dimensional coordinates.

2. The system as set forth in claim 1 wherein said at least one output device includes at least one robotic dummy selectively moveably disposed in at least one of said first and second pods, said robotic dummy connected to one of said first and second controllers for selectively being controlled for interacting with one of the first and second users in response to input data provided by one of said input sensors.

3. The system as set forth in claim 2 wherein said at least one robotic dummy includes a first robotic dummy disposed in said first pod and electrically connected to said first controller, and said at least one robotic dummy includes a second robotic dummy disposed in said second pod and electrically connected to said second controller.

4. The system as set forth in claim 2 wherein said robotic dummy is generally sized and shaped like a human.

5. The system as set forth in claim 1 wherein said at least one input sensor further includes at least one of an accelerometer, a light sensor, a physical energy sleeve, a laser grid, a motion detecting glove, a virtual reality headset, and a scent detecting device.

6. The system as set forth in claim 1 wherein said at least one output device includes at least one of an air ballast, an electric impulse emitter, a vibrating device, a thermal manipulator, and a scent emitting device.

7. The system as set forth in claim 1 further including a first application server electrically connecting said first controller unit and said mainframe, and a second application server electrically connecting said second controller unit and said mainframe.

8. The system as set forth in claim 7 wherein first controlling unit and said first application server and said mainframe are connected via an internet connection, and said second controlling unit and said second application server and said mainframe are connected via an internet connection.

9. A system for simulating a presence between a first user at a first location and a second user at a second location, comprising:
  a first environment for containing the first user;
  said first environment including a first pod and a first user suit disposed in said first pod for being worn by the first user;
  said first pod including a floor and at least a pair of walls each extending generally perpendicularly to said floor to define a first grid having horizontal axes extending parallel to said floor and vertical axes extending parallel to said walls;
  a first controller unit electrically connected with said first pod and said first user suit for receiving inputs and emitting outputs to said first pod and said first user suit;
  a plurality of input sensors disposed in said first pod and electrically connected to said first controller unit for providing said first controller unit with input data detected by said input sensors of said first pod;
  said input sensors including at least one of an accelerometer, a motion sensor, a light sensor, a physical energy sleeve, a laser grid, a motion detecting glove, and a virtual reality headset;
  at least one of said input sensors being a motion sensor providing said first controller unit with three-dimensional coordinates of the location of said first user suit within said first grid;
  a plurality of output devices disposed in said first pod electrically connected with said first controller unit for selectively being activated;
  said output devices including at least one output device disposed on said first user suit for providing physical feedback to the first user;
  said output devices including at least one of an air ballast, an electric impulse emitter, a vibrating device, a thermal manipulator, and a scent emitting device;
  at least one of said output devices including a first robotic dummy selectively moveably disposed in said first pod and electrically connected to said first controller unit for selectively moving to interact with the first user;
  said first robotic dummy being generally sized and shaped like a human;
  a first application server electrically connected with said first controller unit for receiving said input data from said input sensors;
  said first application server and said first controller unit connected by way of an internet connection;
  a second environment for containing the second user;
  said second environment including a second pod and a second user suit disposed in said second pod for being worn by the second user;
  said second pod including a floor and at least a pair of walls each extending generally perpendicularly to said floor to define a second grid having horizontal axes extending parallel to said floor and vertical axes extending parallel to said walls;
  a second controller unit electrically connected with said second pod and said second user suit for receiving inputs and emitting outputs to said second pod and said second user suit;
  a plurality of input sensors disposed in said second pod and electrically connected to said second controller unit for providing said second controller unit with input data detected by said input sensors of said second pod;
  at least one of said input sensors being a motion sensor providing said second controller unit with three-dimensional coordinates of the location of said second user suit within said second grid;
  a plurality of output devices disposed in said second pod electrically connected with said second controller unit for selectively being activated to provide physical feedback to the second user;
  said output devices including at least one output device disposed on said second user suit for providing physical feedback to the second user;
  at least one of said output devices including a second robotic dummy selectively moveably disposed in said second pod and electrically connected to said second controller unit for selectively moving to interact with the second user;
  said second robotic dummy being generally sized and shaped like a human;
  a second application server electrically connected with said second controller unit for receiving said input data from said input sensors;
  said second application server and said second controller unit connected by way of an internet connection;
  a mainframe electrically connected with said first and second application servers for receiving inputs from said first and second controller units and for providing instructions to said first and second controller units for activating said output devices in said first and second pods and for moving said first and second robotic dummies based on said detected three-dimensional coordinates of said locations of said first and second user suits to simulate the interaction of the first and second users with one another; and
  said mainframe and said first and second application servers connected by way of an internet connection.

10. A method for simulating a presence between a first user in a first pod at a first location and a second user in a second pod at a second location, said method comprising:
  detecting a position of at least part of a first user suit in the first pod using an input sensor, and detecting a position of at least part of a second user suit in the second pod using an input sensor;

electronically transmitting the detected position of the first user suit to a mainframe, and electronically transmitting the detected position of the second user suit to a mainframe;

electronically transmitting the detected position of the first user suit from the mainframe to a second controller that is electronically connected with the second pod and the second user suit, and electronically transmitting the detected position of the second user suit from the mainframe to a first controller that is electronically connected with the first pod and the first suit; and activating an output device disposed in the second pod at a location that correlates with the detected position of the first user suit by the second controller, and activating an output device disposed in the first pod at a location that correlates with the detected position of the second user suit by the first controller;

wherein said step of detecting a position of at least part of a first user suit includes detecting three-dimensional coordinates of the first user suit within the first pod, and said step of detecting a position of at least part of a second user suit includes detecting three-dimensional coordinates of the second suit within the second pod; and said step of activating an output device disposed in the second pod at a location that correlates with the detected position of the first user suit includes activating the output device in the second pod at the detected three-dimensional coordinates of the first user suit, and said step of activating an output device disposed in the first pod at a location that correlates with the detected position of the second user suit includes activating the output device in the first pod at the detected three-dimensional coordinates of the second user suit.

11. The method of claim 10 wherein the output device is at least one of an air ballast, an electric impulse emitter, a vibrating device, a thermal manipulator and a scent emitting device.

12. The method of claim 10 wherein the output device is a robotic dummy being selectably moveable.

13. The method of claim 10 wherein the input sensor includes at least one of an accelerometer, a motion sensor, a light sensor, a physical energy sleeve, a laser grid, a motion detecting glove, and a virtual reality headset.

14. The method of claim 10 wherein said step of electronically transmitting the detected position of the first user suit to a mainframe includes electronically transmitting the detected position from the first controller to a first application server and electronically transmitting the detected position from the first application server to the mainframe, and said step of electronically transmitting the detected position of the second user suit to a mainframe includes electronically transmitting the detected position from the second controller to a second application server and electronically transmitting the detected position from the second application server to the mainframe.

15. A system for simulating a presence between a first user at a first location and a second user at a second location, comprising:

a first pod at the first location for being entered by the first user;

said first pod defining a first grid having a plurality of horizontal axes and a plurality of vertical axes extending perpendicularly to said plurality of horizontal axes;

a first controller unit electrically connected with said first pod for receiving inputs and emitting outputs to said first pod;

at least one motion sensor disposed in said first pod and electrically connected to said first controller unit for detecting movement within said first pod and providing said first controller unit input data associated with said detected movement;

at least one output device disposed in said first pod and electrically connected with said first controller unit for selectively being activated;

a second pod at the second location for being entered by the second user;

said second pod defining a second grid having a plurality of horizontal axes and a plurality of vertical axes extending perpendicularly to said plurality of horizontal axes;

a second controller unit electrically connected with said second pod for receiving inputs and emitting outputs to said second pod;

at least one motion sensor disposed in said second pod and electrically connected to said second controller unit for detecting movement within said second pod and providing said second controller unit with input data associated with said detected movement;

at least one output device disposed in said second pod and electrically connected with said second controller unit for selectively being activated; and a mainframe electrically connected with said first and second controller units receiving inputs from said first and second controller units and providing instructions to said first and second controller units to activate said output devices at locations that correspond with said movement detected by said motion sensors of said first and second pods;

wherein said motion sensor of said first pod provides said first controller unit with three-dimensional coordinates of the location of said movement within said first grid, and said motion sensor of said second pod provides said second controller unit with three-dimensional coordinates of the location of said movement within said second grid to activate said output devices at locations that correspond with said three-dimensional coordinates.

16. The system as set forth in claim 15 wherein said at least one output device includes at least one robotic dummy selectively moveably disposed in at least one of said first and second pods, said robotic dummy connected to one of said first and second controllers for selectively being controlled for interacting with one of the first and second users in response to input data provided by one of said input sensors.

17. The system as set forth in claim 16 wherein said at least one robotic dummy includes a first robotic dummy disposed in said first pod and electrically connected to said first controller, and said at least one robotic dummy includes a second robotic dummy disposed in said second pod and electrically connected to said second controller.

18. The system as set forth in claim 15 wherein said at least one output device includes at least one of an air ballast, an electric impulse emitter, a vibrating device, a thermal manipulator, and a scent emitting device.

19. The system as set forth in claim 15 further including a least one user suit disposed in at least one of said first and second pods, and wherein said at least one output device includes at least one output device disposed on one of said first and second user suits for providing a physical stimulus to the first or second user.

20. The system as set forth in claim 19 wherein said at least one user suit includes a first user suit disposed in said first pod for being worn by the first user and a second user suit disposed in said second pod for being worn by the second user, and wherein said at least one output device includes an output device disposed on said first user suit and an output device disposed on said second user suit.

* * * * *